United States Patent
Harada et al.

(10) Patent No.: US 10,925,292 B2
(45) Date of Patent: Feb. 23, 2021

(54) METHOD FOR PRODUCING FERMENTED MILK PRODUCT USING STERILE FULL-FAT SOYBEAN POWDER AS STARTING MATERIAL AND FERMENTED MILK PRODUCT

(71) Applicant: PELICAN CO., LTD., Saitama (JP)

(72) Inventors: Hiroshi Harada, Saitama (JP); Akinori Hiramatsu, Saitama (JP)

(73) Assignee: PELICAN CO., LTD., Saitama (JP)

(\*) Notice: Subject to any disclaimer, the term of this patent is extended or adjusted under 35 U.S.C. 154(b) by 169 days.

(21) Appl. No.: 14/377,952

(22) PCT Filed: Nov. 21, 2013

(86) PCT No.: PCT/JP2013/081429
§ 371 (c)(1),
(2) Date: Aug. 11, 2014

(87) PCT Pub. No.: WO2014/091899
PCT Pub. Date: Jun. 19, 2014

(65) Prior Publication Data
US 2015/0037461 A1 Feb. 5, 2015

(30) Foreign Application Priority Data

Dec. 11, 2012 (JP) .............................. JP2012-270189
Apr. 25, 2013 (JP) .............................. JP2013-092482

(51) Int. Cl.
*A23C 9/12* (2006.01)
*A23C 11/10* (2021.01)
(Continued)

(52) U.S. Cl.
CPC .............. *A23C 11/106* (2013.01); *A23C 9/12* (2013.01); *A23C 9/1315* (2013.01);
(Continued)

(58) Field of Classification Search
CPC .......... A23V 2002/00; A23V 2250/206; A23V 2250/5488; A61K 2300/00; A61K 35/747;
(Continued)

(56) References Cited

U.S. PATENT DOCUMENTS 6,699,517 B2\* 3/2004 Boufassa ................ A23L 1/105
426/28
2002/0012719 A1\* 1/2002 Nadland ............... A23C 9/1315
426/34
2005/0281938 A1 12/2005 Harada

FOREIGN PATENT DOCUMENTS

JP 52-156962 A 12/1977
JP 64-013958 A 1/1989
(Continued)

OTHER PUBLICATIONS

Katz, Sandor Ellix, The Art of Fermentation: An In-Depth Exporation of Essential Concepts and Processes from Around the Word, 2012, pp. 202.\*
(Continued)

*Primary Examiner* — Hong T Yoo
(74) *Attorney, Agent, or Firm* — McGlew and Tuttle, P.C.

(57) ABSTRACT

A production method for an edible fermented dairy product using, as a raw material, sterile full fat soy flour and a fermented dairy product produced by the method. A production method for a fermented dairy product includes the steps of: producing sterile full fat soy flour having a grain size of from 100 to 1,000 meshes by pulverizing sterile dehulled soybeans prepared so as to have a bacterial count of 300 cells/g or less by using a method of separating whole soybeans into cotyledons, germs, and hulls; adding water to the sterile full fat soy flour to prepare a powdered soy juice, followed by sterilizing the powdered soy juice by heating; homogenizing the powdered soy juice to prepare a homogenized powdered soy juice; and adding a lactic acid bacte-
(Continued)

rium to the homogenized powdered soy juice, followed by fermentation to prepare fermented milk.

19 Claims, 1 Drawing Sheet

(51) Int. Cl.
*A23C 9/13* (2006.01)
*A23C 20/02* (2021.01)
*A23C 19/055* (2006.01)
*A23L 11/50* (2021.01)
*A23L 2/38* (2021.01)

(52) U.S. Cl.
CPC ............ *A23C 19/055* (2013.01); *A23C 20/02* (2013.01); *A23C 20/025* (2013.01); *A23L 2/382* (2013.01); *A23L 11/50* (2021.01); *A23V 2002/00* (2013.01); *A23Y 2240/21* (2013.01); *A23Y 2260/21* (2013.01)

(58) Field of Classification Search
CPC .... A61K 35/745; A61K 35/744; A61K 36/06; A23L 1/2008; A23L 11/00; A23C 11/106; A23C 9/123; A23C 20/025; A23C 19/0323; A23C 9/1238; A23C 11/10; A23C 9/12; A23C 9/1234; A23C 9/1275
See application file for complete search history.

(56) References Cited

FOREIGN PATENT DOCUMENTS

| | | |
|---|---|---|
| JP | 1-128759 A | 5/1989 |
| JP | 10-229841 A | 9/1998 |
| JP | 2003-23988 A | 1/2003 |
| JP | 2008-295348 A | 12/2008 |
| JP | 2009-136158 A | 6/2009 |
| JP | 2011-135832 A | 7/2011 |
| WO | 2004/060079 A1 | 7/2004 |

OTHER PUBLICATIONS

Evidence Taken Before the Joint Committee on Tuberculin Test, vol. II, Illinois State Journal Co., State Printers, 1912. p. 89.*

* cited by examiner

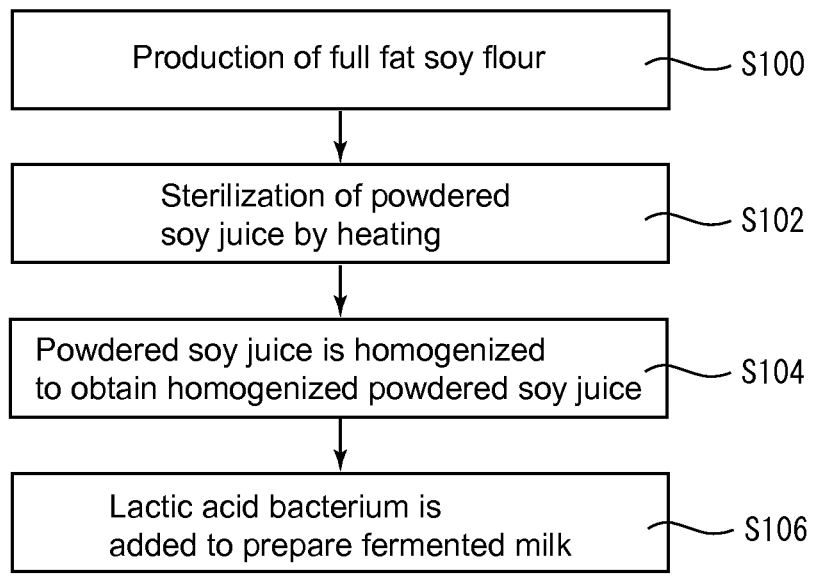

METHOD FOR PRODUCING FERMENTED MILK PRODUCT USING STERILE FULL-FAT SOYBEAN POWDER AS STARTING MATERIAL AND FERMENTED MILK PRODUCT

TECHNICAL FIELD

The present invention relates to a production method for a fermented dairy product using, as a raw material, sterile full fat soy flour obtained by pulverizing a whole soybean, and to a fermented dairy product produced by the method.

BACKGROUND ART

Heretofore, the applicant has proposed technologies disclosed in Patent Document 1 as a production method for powder soy milk using soy flour as a raw material, powder soy milk, and a dairy product obtained by processing the powder soy milk. The soy flour disclosed in Patent Document 1 is soy flour obtained by pulverizing whole soybeans, and hence contains the whole soybeans. The powder soy milk is obtained by using the soy flour as a raw material without separation of okara, and hence has a very high nutritional value and is rich in dietary fibers.

In addition, the applicant has proposed technologies disclosed in Patent Document 2 as a sterile dehulled soybean and a production method for sterile full fat soy flour. The sterile full fat soy flour disclosed in Patent Document 2, which is produced using sterile dehulled soybeans having a bacterial count of 300 cells/g or less, is adequately sterilized full fat soy flour in which grassy-smelling characteristic of soybeans is removed (deodorized) without impairing available ingredients (nutrition composition) possessed by soybeans such as water-soluble proteins, and digestion and absorption rate is high due to inactivation of a digestion inhibiting enzyme.

However, when a fermented dairy product such as a yogurt is produced using the sterile full fat soy flour, separation occurs during a fermentation process. As a result, the upper part contains only whey, and hence desired fermentation cannot be conducted, resulting in a problem of rough texture.

PRIOR ART DOCUMENTS

Patent Document

Patent Document 1: JP 2003-23988 A
Patent Document 2: WO 2004/060079 A1

SUMMARY OF THE INVENTION

Problems to be Solved by the Invention

The present invention has been made in view of the problems of the related art, and an object of the present invention is to provide a production method for an edible fermented dairy product using, as a raw material, sterile full fat soy flour, which has a very high nutritional value and has a markedly improved taste evaluation that includes flavor and smooth texture, and a fermented dairy product produced by the method.

More specifically, an object of the present invention is to provide a fermented dairy product that has a high nutritional value and is rich in plant fibers by inoculating a lactic acid bacterium into whole-grain soy flour containing an okara component and fermenting the mixture.

Means for Solving Problems

In order to achieve the above-mentioned object, a production method for a fermented dairy product using sterile full fat soy flour as a raw material according to one embodiment of the present invention includes the steps of: producing sterile full fat soy flour having a grain size of from 100 to 1,000 meshes by pulverizing sterile dehulled soybeans prepared so as to have a bacterial count of 300 cells/g or less by using a method of separating whole soybeans into cotyledons, germs, and hulls; adding water to the sterile full fat soy flour to prepare a powdered soy juice, followed by sterilizing the powdered soy juice by heating; homogenizing the powdered soy juice to prepare a homogenized powdered soy juice; and adding a lactic acid bacterium to the homogenized powdered soy juice, followed by fermentation to prepare fermented milk.

In producing the sterile full fat soy flour having a grain size of from 100 to 1,000 meshes by pulverizing sterile dehulled soybeans prepared so as to have a bacterial count of 300 cells/g or less by using a method of separating whole soybeans into cotyledons, germs, and hulls, there may be employed the production method for sterile full fat soy flour disclosed in Patent Document 2.

More specifically, as disclosed in Patent Document 2, the sterile full fat soy flour can be produced by the production method for sterile full fat soy flour, which includes:

(a) a sorting step of removing foreign matters from starting soybeans to obtain sorted soybeans;

(b) a dehulling step of removing germs and hulls from the sorted soybeans to obtain sterile dehulled soybeans;

(c) a partially-inactivating steaming step of steaming the sterile dehulled soybeans for from 60 to 300 seconds by hot water or steam heated at a temperature of from 70 to 125° C. so as to deodorize the sterile dehulled soybeans and inactivate a digestion inhibiting enzyme;

(d) a desiccating step of desiccating the steamed sterile dehulled soybeans to a water content of 7% or less;

(e) a pulverizing step of pulverizing the desiccated sterile dehulled soybeans; and (f) a classifying step of classifying the pulverized sterile dehulled soybeans into only soy flour having a grain size of from 100 to 1,000 meshes. A lot of contaminating bacteria adhere to the hulls of the soybeans, but sterile dehulled soybeans having a bacterial count of 300 cells/g or less (the bacterial count is measured according to the "Guideline of Food and Health Inspection" (edited by The Life and Health Division of The Welfare Ministry)) can be obtained by completely removing the hulls where a lot of contaminating bacteria are present. The resultant soy flour is sterile full fat soy flour because the soy flour is prepared using the sterile dehulled soybeans.

The step of homogenizing the powdered soy juice is preferably conducted after the step of sterilizing the powdered soy juice by heating or during the step of sterilizing the powdered soy juice by heating.

In addition, the lactic acid bacterium is preferably a lactic acid bacterium that grows well in a steamed soybean soup or soy milk, and is preferably a plant origin lactic acid bacterium or a dairy lactic acid bacterium, for example. The plant origin lactic acid bacterium is preferably a lactic acid bacterium separated from sake yeast mash, and examples of the lactic acid bacterium separated from sake yeast mash include *Leuconostoc citreum* and *Lactobacillus curvantus*.

As the dairy lactic acid bacterium, there may be used a dairy lactic acid bacterium separated from, for example, a commercially available yogurt or cheese and cultured, such as *Lactococcus lactis* subsp. *Cremoris, Lactococcus lactis* subsp. *lactis*, or *Leuconostoc mesenteroides*.

Further, the starter medium for the lactic acid bacterium is preferably the homogenized powdered soy juice. When the homogenized powdered soy juice is used as the starter medium for the lactic acid bacterium, there is an advantage in that even a person having an allergy to a dairy product can eat the resultant product without worry.

In selecting the bacterial strain, a bacterial strain capable of fermenting even in a soybean component needs to be selected. If necessary, some dairy products or sugars may be added as a fermentation aid.

In the production method, the fermented milk preferably includes a yogurt.

In addition, the production method may further include the step of removing whey from the fermented milk to produce a cheese.

The production method may further include the step of adding a sweetener to the fermented milk, followed by sterilizing the milk to produce a sterilized dairy product lactic acid bacteria beverage.

The production method may further include the step of mixing a stabilizer and sugar in the fermented milk, followed by homogenizing the mixture to produce a lactic acid bacteria beverage.

A fermented dairy product according to one embodiment of the present invention is produced by the method.

A yogurt according to one embodiment of the present invention is produced by the method.

The yogurt suitably has a hardness, determined by hardness measurement using a creep test device, of from 30 gf/cm$^2$ to 200 gf/cm$^2$.

A cheese according to one embodiment of the present invention is produced by the method.

A sterilized dairy product lactic acid bacteria beverage according to one embodiment of the present invention is produced by the method.

A lactic acid bacteria beverage according to one embodiment of the present invention is produced by the method.

Advantageous Effect of the Invention

According to one embodiment of the present invention, the following significant effects are provided: the production method for an edible fermented dairy product using, as a raw material, sterile full fat soy flour, which has a very high nutritional value and has a markedly improved taste evaluation that includes flavor and smooth texture, and the fermented dairy product produced by the method can be provided.

More specifically, when the resultant fermented dairy product, to which an organic acid or the like has been appropriately added depending on the acid degree of the fermented dairy product so as to suit an intended product item, is adjusted, if necessary, with a sweetener such as sugar, a stabilizer, and the like, whole-grain soybean fermented milk or fermented milk largely formed of whole-grain soybeans can be obtained. The resultant fermented milk can be used for development of whole-grain soybean fermented dairy products in wide fields, such as a variety of fermented dairy products obtained using milk as a base.

BRIEF DESCRIPTION OF DRAWING

FIG. 1 is a flow chart illustrating a production method for a fermented dairy product using sterile full fat soy flour as a raw material according to the present invention.

MODES FOR CARRYING OUT THE INVENTION

Hereinafter, embodiments of the present invention are described. It should be appreciated, however, that these embodiments are merely illustrative, and a variety of modifications may be made without departing from the technical concept of the present invention.

FIG. 1 is a flow chart illustrating steps of a production method for a fermented dairy product using sterile full fat soy flour as a raw material of the present invention.

Firstly, sterile dehulled soybeans having a bacterial count of 300 cells/g or less are produced by a method of separating whole soybeans into cotyledons, germs, and hulls, and the resultant sterile dehulled soybeans are pulverized to produce sterile full fat soy flour having a grain size of from 100 to 1,000 meshes (Step 100 in FIG. 1).

In producing the sterile dehulled soybeans having a bacterial count of 300 cells/g or less by the method of separating whole soybeans into cotyledons, germs, and hulls, the method disclosed in Patent Document 2 may be employed.

As to the grain size of the sterile full fat soy flour, the sterile full fat soy flour may be classified by means of a commercially available classifying machine or a sieve for grinding so as to contain only grains having grain sizes of from 100 to 1,000 meshes.

Then, water is added to the sterile full fat soy flour, the mixture is stirred to prepare a powdered soy juice, and the powdered soy juice is sterilized by heating (Step 102 in FIG. 1).

In sterilizing the powdered soy juice by heating, the powdered soy juice is subjected to heating sterilization treatment specified by the Food Sanitation Act. As specified by the Food Sanitation Act, for example, the heating sterilization treatment may be conducted at 65° C. for 30 minutes or under similar conditions, such as at 90° C. for 15 minutes. Then, after the heating sterilization treatment, the powdered soy juice is cooled to 37° C. to 30° C.

Further, the powdered soy juice is homogenized to prepare a homogenized powdered soy juice (Step 104 in FIG. 1). In homogenizing the powdered soy juice, homogenization is preferably conducted during the heating sterilization step. In conducting the homogenization treatment, for example, the homogenization treatment may be conducted for a mixture containing the sterile full fat soy flour at a solid concentration of from 10 to 25 wt % using a high-pressure homogenizer (LAB40) manufactured by GAULIN under a condition of about from 200 to 1,000 kgf/cm$^2$, desirably from 300 to 800 kgf/cm$^2$.

Then, a lactic acid bacterium is added to the homogenized powdered soy juice and subjected to fermentation to prepare fermented milk (Step 106 in FIG. 1). The lactic acid bacterium to be used only needs to be one capable of assimilating a soy milk component and having high fermentation ability, and is preferably a lactic acid bacterium separated from sake yeast mash. For example, there may be used *Lactobacillus curvatus* or *Leuconostoc citreum* separated from sake yeast mash. In addition, there may also be used, for example, a dairy lactic acid bacterium separated from a yogurt or a cheese, such as *Lactococcus lactis* subsp. *cremoris, Lac-*

*tococcus lactis* subsp. *lactis*, or *Leuconostoc mesenteroides*. It should be noted that a dairy lactic acid bacterium separated from a commercially available yogurt and cultured may be used.

The fermented dairy product of the present invention may be obtained by inoculating a lactic acid bacterium starter such as the above-mentioned lactic acid bacteria into the powdered soy juice according to a routine procedure and fermenting the mixture. In preparing the lactic acid bacterium starter, the homogenized powdered soy juice is preferably used as a medium. When the homogenized powdered soy juice is used as the medium for the lactic acid bacterium starter, there is an advantage in that even a person having an allergy to a dairy product can eat the resultant product without worry.

In this manner, the fermented dairy product of the present invention can be obtained, and the thus obtained fermented dairy product is a plain yogurt. The yogurt preferably has a hardness, determined by hardness measurement using a creep test device, of from 30 gf/cm$^2$ to 200 gf/cm$^2$. Thus, as the fermented dairy product of the present invention, a yogurt having a higher hardness than that of a conventional one is obtained. Further, when a sweetener, a fruit, or the like is added to the fermented milk, a variety of yogurt products can be obtained.

In addition, when whey is removed from the fermented milk produced by the above-mentioned method according to a routine procedure, a cheese can be produced.

Further, when a sweetener such as sugar is added to the fermented milk produced by the above-mentioned method, followed by sterilization, according to a routine procedure, a sterilized lactic acid bacteria beverage can be produced.

In addition, when a stabilizer and sugar are mixed in the fermented milk produced by the above-mentioned method, followed by homogenization, according to a routine procedure, a lactic acid bacteria beverage can be produced.

EXAMPLES

The present invention is hereinafter described in more detail with Examples, but it is needless to say that Examples are only illustrative and not intended to be interpreted in a limited way.

Example 1

First, a sorting step was conducted in the following manner to obtain sorted soybeans from starting soybeans.

From 100 kg of the starting soybeans, foreign matters larger than soybeans (corn, mud mass, and the like) or foreign matters smaller than soybeans (grass seeds, morning glory seeds, and the like) were removed by means of a commercially available rough sorting machine, light foreign matters (dirt, skin, small dust, and the like) were removed by means of a commercially available gravity separator, foreign matters heavier than soybeans such as stones were removed by means of a commercially available stone removing machine, foreign matters having different shapes were removed by means of a commercially available roller sorting machine, and the resultant soybeans were sorted according to the grain size by means of a commercially available grain size sorting machine.

Next, a dehulling step was conducted in the following manner to obtain sterile dehulled soybeans.

After heating by hot air at a temperature of about 100° C. for about 5 minutes by means of a commercially available heating machine so that the temperature of the soybeans was about 60° C., the heated soybeans were subjected to a commercially available auxiliary dehulling machine (used under the following conditions: an interval between two rubber rollers was 1 to 5 mm; rotation speeds of the two rubber rollers were 809 rpm for one and 1,050 rpm for the other; and a difference in rotation number of them was about 20%) to generate cracks on the soybeans.

The soybeans having cracks were dehulled by means of a commercially available dehulling machine (rotation number of a plurality of blades was 300 rpm), and about half of the hulls dehulled was removed by means of a dirt collector. The remainder of dehulled hulls not removed by the dirt collector was removed by a commercially available air sorting machine.

The remaining soybean mixture after removal of the hulls was subjected to a commercially available multi-stage sieving apparatus to separate into cotyledons and germs. More specifically, the soybean mixture after the air sorting treatment was subjected to the first sieve to separate into whole soybeans not having been dehulled (undehulled whole soybeans) and a mixture of cotyledons split into two cotyledons (half-split cotyledons) and germs, and then the mixture of cotyledons and germs was subjected to the second sieve to separate into half-split cotyledons and germs.

Some hulls remained on these separated cotyledons. The separated cotyledons were cooled by room temperature air by means of a commercially available cooling tank (equipped with a cooling fan and having a capacity of about 8 m$^3$), and the cooled cotyledons were again subjected to dehulling treatment by means of a commercially available dehulling machine, to remove the hulls remaining on the cotyledons.

The resultant sterile dehulled soybeans were inspected for the bacterial count in accordance with the "Guideline of Food and Health Inspections" (edited by The Life Health Division of The Welfare Ministry), and the bacterial count was found to be 300 cells/g or less.

As to the sterile dehulled soybeans, using a commercially available continuous steaming furnace, steaming was executed for 120 seconds by steam at a temperature of 90° C.

The sterile dehulled soybeans after steaming were dried to a water content of 6 mass % by using a commercially available desiccator.

Then, using a commercially available pulverizer that was preliminarily sterilized by heating under internal circulation of hot air at 100° C. by an AEROFIN HEATER, the dried sterile dehulled soybeans were roughly pulverized at a grain size of 30 meshes, followed by fine pulverizing at a grain size of 600 meshes.

Using a commercially available classifying machine, the obtained soy flour was classified so as to contain only grains having grain sizes of 600 meshes or less. Soy flour containing grains having grain sizes of 600 meshes or more was put again into the pulverizer.

The thus produced sterile full fat soy flour was used as a raw material. A mixture containing the sterile full fat soy flour at a solid concentration of 16 wt % was subjected to homogenization treatment at about 600 kgf/cm$^2$ to prepare homogenized powder soy milk, and the homogenized powder soy milk was sterilized by heating at 90° C. for 15 minutes and then cooled to 37° C. to 30° C.

A solution obtained by appropriately diluting the homogenized powder soy milk to a concentration appropriate as a starter concentration (8 to 14%) was used as a medium, and, for example, *Lactococcus lactis* subsp. *cremoris* that is a dairy lactic acid bacterium suitable for the soy flour prepared above and was separated from a cheese or a yogurt was, as a lactic acid bacterium starter, aseptically inoculated into a fermentation tank and subjected to mixing or added to a separate container. The bacterium was subjected to fermentation at 36° C. for from 12 to 20 hours to obtain fermented milk having a lactic acid degree of from 0.5% to 1.0% (which was calculated as the amount of lactic acid by titration with 0.1 N sodium hydroxide), causing no water separation, and forming smooth curds.

The resultant fermented milk was a plain yogurt having a smooth texture on the tongue. In addition, the resultant plain yogurt was subjected to hardness measurement using a creep test device. The hardness measurement was conducted using a creep test device manufactured by Yamaden Co., Ltd. (product name: Rheoner RE33005). The result of the hardness measurement was 200 gf/cm$^2$.

Example 2

First, a sorting step was conducted in the following manner to obtain sorted soybeans from starting soybeans.

From 100 kg of the starting soybeans, foreign matters larger than soybeans (corn, mud mass, and the like) or foreign matters smaller than soybeans (grass seeds, morning glory seeds, and the like) were removed by means of a commercially available rough sorting machine, light foreign matters (dirt, skin, small dust, and the like) were removed by means of a commercially available gravity separator, foreign matters heavier than soybeans such as stones were removed by means of a commercially available stone removing machine, foreign matters having different shapes were removed by means of a commercially available roller sorting machine, and the resultant soybeans were sorted according to the grain size by means of a commercially available grain size sorting machine.

Next, a dehulling step was conducted in the following manner to obtain sterile dehulled soybeans.

After heating by hot air at a temperature of about 100° C. for about 5 minutes by means of a commercially available heating machine so that the temperature of the soybeans was about 60° C., the heated soybeans were subjected to a commercially available auxiliary dehulling machine (used under the following conditions: an interval between two rubber rollers was 1 to 5 mm; rotation speeds of the two rubber rollers were 809 rpm for one and 1,050 rpm for the other; and a difference in rotation number of them was about 20%) to generate cracks on the soybeans.

The soybeans having cracks were dehulled by means of a commercially available dehulling machine (rotation number of a plurality of blades was 300 rpm), and about half of the hulls dehulled was removed by means of a dirt collector. The remainder of dehulled hulls not removed by the dirt collector was removed by a commercially available air sorting machine.

The remaining soybean mixture after removal of the hulls was subjected to a commercially available multi-stage sieving apparatus to separate into cotyledons and germs. More specifically, the soybean mixture after the air sorting treatment was subjected to the first sieve to separate into whole soybeans not having been dehulled (undehulled whole soybeans) and a mixture of cotyledons split into two cotyledons (half-split cotyledons) and germs, and then the mixture of cotyledons and germs was subjected to the second sieve to separate into half-split cotyledons and germs.

Some hulls remained on these separated cotyledons. The separated cotyledons were cooled by room temperature air by means of a commercially available cooling tank (equipped with a cooling fan and having a capacity of about 8 m$^3$), and the cooled cotyledons were again subjected to dehulling treatment by means of a commercially available dehulling machine, to remove the hulls remaining on the cotyledons.

The resultant sterile dehulled soybeans were inspected for the bacterial count in accordance with the "Guideline of Food and Health Inspections" (edited by The Life Health Division of The Welfare Ministry), and the bacterial count was found to be 300 cells/g or less.

As to the sterile dehulled soybeans, using a commercially available continuous steaming furnace, steaming was executed for 120 seconds by steam at a temperature of 90° C.

The sterile dehulled soybeans after steaming were dried to a water content of 6 mass % by using a commercially available desiccator.

Then, using a commercially available pulverizer that was preliminarily sterilized by heating under internal circulation of hot air at 100° C. by an AEROFIN HEATER, the dried sterile dehulled soybeans were roughly pulverized at a grain size of 30 meshes, followed by fine pulverizing at a grain size of 600 meshes.

Using a commercially available classifying machine, the obtained soy flour was classified so as to contain only grains having grain sizes of 600 meshes or less. Soy flour containing grains having grain sizes of 600 meshes or more was put again into the pulverizer.

The thus produced sterile full fat soy flour was used as a raw material. A mixture containing the sterile full fat soy flour at a solid concentration of 16 wt % was subjected to homogenization treatment at about 600 kgf/cm$^2$, and the homogenized product was sterilized by heating at 90° C. for 15 minutes and then cooled to 37° C. to 30° C.

*Leuconostoc citreum*, which was preliminarily prepared using, as a medium, MRS Culture Media Broth manufactured by Difco, is a plant origin lactic acid bacterium suitable for the soy flour, and was separated from sake yeast mash, was, as a starter, aseptically inoculated into a fermentation tank and subjected to mixing or added to a separate container. The bacterium was subjected to static fermentation at 28° C. for 24 hours to obtain fermented milk having a lactic acid degree of from 0.5% to 1.0% (which was calculated as the amount of lactic acid by titration with 0.1 N sodium hydroxide), causing no water separation, and forming smooth curds.

The resultant fermented milk was a plain yogurt having a smooth texture on the tongue. In addition, the resultant plain yogurt was subjected to hardness measurement using a creep test device. The hardness measurement was conducted using a creep test device manufactured by Yamaden Co., Ltd. (product name: Rheoner RE33005). The result of the hardness measurement was 80 gf/cm$^2$.

Example 3

First, a sorting step was conducted in the following manner to obtain sorted soybeans from starting soybeans.

From 100 kg of the starting soybeans, foreign matters larger than soybeans (corn, mud mass, and the like) or foreign matters smaller than soybeans (grass seeds, morning glory seeds, and the like) were removed by means of a commercially available rough sorting machine, light foreign matters (dirt, skin, small dust, and the like) were removed by means of a commercially available gravity separator, foreign matters heavier than soybeans such as stones were removed by means of a commercially available stone removing machine, foreign matters having different shapes were removed by means of a commercially available roller sorting machine, and the resultant soybeans were sorted according to the grain size by means of a commercially available grain size sorting machine.

Next, a dehulling step was conducted in the following manner to obtain sterile dehulled soybeans.

After heating by hot air at a temperature of about 100° C. for about 5 minutes by means of a commercially available heating machine so that the temperature of the soybeans was about 60° C., the heated soybeans were subjected to a commercially available auxiliary dehulling machine (used under the following conditions: an interval between two rubber rollers was 1 to 5 mm; rotation speeds of the two rubber rollers were 809 rpm for one and 1,050 rpm for the other; and a difference in rotation number of them was about 20%) to generate cracks on the soybeans.

The soybeans having cracks were dehulled by means of a commercially available dehulling machine (rotation number of a plurality of blades was 300 rpm), and about half of the hulls dehulled was removed by means of a dirt collector. The remainder of dehulled hulls not removed by the dirt collector was removed by a commercially available air sorting machine.

The remaining soybean mixture after removal of the hulls was subjected to a commercially available multi-stage sieving apparatus to separate into cotyledons and germs. More specifically, the soybean mixture after the air sorting treatment was subjected to the first sieve to separate into whole soybeans not having been dehulled (undehulled whole soybeans) and a mixture of cotyledons split into two cotyledons (half-split cotyledons) and germs, and then the mixture of cotyledons and germs was subjected to the second sieve to separate into half-split cotyledons and germs.

Some hulls remained on these separated cotyledons. The separated cotyledons were cooled by room temperature air by means of a commercially available cooling tank (equipped with a cooling fan and having a capacity of about 8 m$^3$), and the cooled cotyledons were again subjected to dehulling treatment by means of a commercially available dehulling machine, to remove the hulls remaining on the cotyledons.

The resultant sterile dehulled soybeans were inspected for the bacterial count in accordance with the "Guideline of Food and Health Inspections" (edited by The Life Health Division of The Welfare Ministry), and the bacterial count was found to be 300 cells/g or less.

As to the sterile dehulled soybeans, using a commercially available continuous steaming furnace, steaming was executed for 120 seconds by steam at a temperature of 90° C.

The sterile dehulled soybeans after steaming were dried to a water content of 6 mass % by using a commercially available desiccator.

Then, using a commercially available pulverizer that was preliminarily sterilized by heating under internal circulation of hot air at 100° C. by an AEROFIN HEATER, the dried sterile dehulled soybeans were roughly pulverized at a grain size of 30 meshes, followed by fine pulverizing at a grain size of 600 meshes.

Using a commercially available classifying machine, the obtained soy flour was classified so as to contain only grains having grain sizes of 600 meshes or less. Soy flour containing grains having grain sizes of 600 meshes or more was put again into the pulverizer.

The thus produced sterile full fat soy flour was used as a raw material. A mixture containing the sterile full fat soy flour at a solid concentration of 16 wt % was subjected to homogenization treatment at about 600 kgf/cm$^2$, and the homogenized product was sterilized by heating at 90° C. for 15 minutes and then cooled to 37° C. to 30° C.

*Lactococcus lactis* subsp. *cremoris*, which was preliminarily prepared using, as a medium, MRS Culture Media Broth manufactured by Difco, is a dairy lactic acid bacterium suitable for the soy flour, and was separated from a cheese, was, as a starter, aseptically inoculated into a fermentation tank and subjected to mixing or added to a separate container. The bacterium was subjected to static fermentation at 28° C. for 24 hours to obtain fermented milk having a lactic acid degree of from 0.5% to 1.0% (which was calculated as the amount of lactic acid by titration with 0.1 N sodium hydroxide), causing no water separation, and forming smooth curds.

The resultant fermented milk was a plain yogurt having a smooth texture on the tongue. In addition, the resultant plain yogurt was subjected to hardness measurement using a creep test device. The hardness measurement was conducted using a creep test device manufactured by Yamaden Co., Ltd. (product name: Rheoner RE33005). The result of the hardness measurement was 200 gf/cm$^2$.

Further, when the fermented milk obtained in this manner is processed by a routine procedure, a variety of dairy products can be obtained. The dairy products to be obtained include many kinds of products such as dairy product lactic acid bacteria beverages, dairy product lactic acid bacteria beverages (sterilized), lactic acid bacteria beverages, yogurts, and cheeses. Depending on the kind of intended fermented milk, a sweetener such as sugar, a stabilizer such as agar or gelatin, a flavor, and the like may be added prior to sterilization to a homogenized mixture containing a soy flour material at a solid concentration of 16 (10 to 25) wt %.

The invention claimed is:

1. A method, comprising the steps of:
   providing sterile dehulled soybeans having a bacterial count of 300 cells/g or less by at completely removing contaminated soybean hulls;
   producing sterile full fat soy flour having a grain size of from 100 to 1,000 meshes by pulverizing the sterile dehulled soybeans;
   adding water to the sterile full fat soy flour to form a hydrated powdered soy juice mixture, followed by heat sterilizing the hydrated powdered soy juice mixture to form a hydrated powdered soy juice, the hydrated powdered soy juice containing the sterile full fat soy flour at a solid concentration from 10 to 25 weight percentage relative to the hydrated powdered soy juice mixture;
   homogenizing the hydrated powdered soy juice to form a homogenized hydrated powdered soy juice, wherein the hydrated powdered soy juice is cooled to 30° C. to 37° C. after the hydrated powdered soy juice is sterilized;
   adding a lactic acid bacterium to the homogenized hydrated powdered soy juice, wherein a medium for lactic acid bacterium starter comprises the homogenized hydrated powdered soy juice; and
   fermenting the homogenized hydrated powdered soy juice with the lactic acid bacterium to prepare fermented soy milk, the fermented soy milk having a lactic degree of 0.5% to 1.0%.

2. A method according to claim 1, wherein the step of homogenizing the hydrated powdered soy juice is conducted after the step of sterilizing the hydrated powdered soy juice by heating or during the step of sterilizing the hydrated powdered soy juice by heating, the lactic degree corresponding to an amount of lactic acid by titration with 0.1 N sodium hydroxide.

3. A method according to claim 1, wherein the lactic acid bacterium comprises a lactic acid bacterium that grows in steamed soybean soup or soy milk, wherein the homogenized hydrated powdered soy juice with the lactic acid bacterium is fermented at 36° C. for twelve to twenty hours.

4. A method according to claim 3, wherein the lactic acid bacterium comprises a plant origin lactic acid bacterium or a dairy lactic acid bacterium.

5. A method according to claim 1, wherein the hydrated powdered soy juice is cooled prior to fermentation.

6. A method according to claim 4, wherein the plant origin lactic acid bacterium is a lactic acid bacterium separated from sake yeast mash.

7. A method according to claim 1, wherein the fermented soy milk is used to form a yogurt.

8. A method according to claim 1, further comprising the step of removing whey from the fermented soy milk to produce a cheese.

9. A method according to claim 1, further comprising the step of adding a sweetener to the fermented soy milk, followed by sterilizing the fermented soy milk to produce a sterilized dairy product lactic acid bacteria beverage.

10. A method according to claim 1, further comprising the step of mixing a stabilizer and sugar in the fermented soy milk, followed by homogenizing the stabilizer and the sugar in the fermented soy milk to produce a lactic acid bacteria beverage.

11. A method according to claim 1, wherein the fermented soy milk is a fermented dairy product.

12. A method according to claim 1, wherein a yogurt is produced, the yogurt comprising at least the fermented soy milk.

13. A method according to claim 12, wherein the yogurt has a hardness, determined by hardness measurement using a creep test device, of from 30 gf/cm$^2$ to 200 gf/cm$^2$.

14. A method according to claim 1, wherein a cheese is produced, the cheese comprising at least the fermented soy milk.

15. A method according to claim 1, wherein a lactic acid bacteria beverage is produced, the lactic acid bacteria beverage comprising at least the fermented soy milk.

16. A method, comprising:
providing sterile dehulled soybeans having a bacterial count of 300 cells/g or less by at least completely removing contaminated soybean hulls;
producing sterile full fat soy flour having a grain size of from 100 to 1,000 meshes by pulverizing the sterile dehulled soybeans;
adding water to the sterile full fat soy flour to form a hydrated powdered soy juice mixture, followed by sterilizing the hydrated powdered soy juice mixture by heating to form a hydrated powdered soy juice, the hydrated powdered soy juice comprising the sterile full fat soy flour at a solid concentration from 10 to 25 weight percentage relative to the hydrated powdered soy juice mixture;
cooling the hydrated powdered soy juice to 30° C. to 37° C. after sterilizing the hydrated powdered soy juice;
homogenizing the hydrated powdered soy juice to form a homogenized hydrated powdered soy juice;
adding a lactic acid bacterium to the homogenized hydrated powdered soy juice, followed by fermentation to form fermented soy milk, wherein a medium for lactic acid bacterium starter comprises the homogenized hydrated powdered soy juice, the fermented soy milk having a lactic degree of 0.5% to 1.0%; and
producing yogurt, the yogurt comprising at least said fermented soy milk.

17. A method according to claim 16, wherein the lactic degree corresponds to an amount of lactic acid by titration with 0.1 N sodium hydroxide, wherein the lactic acid bacterium and the homogenized hydrated powdered soy juice are fermented at 36° C. for twelve to twenty hours.

18. A method, comprising:
providing sterile dehulled soybeans having a bacterial count of 300 cells/g or less by at least completely removing contaminated soybean hulls;
producing sterile full fat soy flour having a grain size of from 100 to 1,000 meshes by pulverizing the sterile dehulled soybeans;
adding water to the sterile full fat soy flour to form a hydrated powdered soy juice mixture, followed by sterilizing the hydrated powdered soy juice mixture by heating to form a hydrated powdered soy juice, the hydrated powdered soy juice comprising the sterile full fat soy flour at a solid concentration from 10 to 25 weight percentage relative to the hydrated powdered soy juice mixture;
cooling the hydrated powdered soy juice to 30° C. to 37° C. after sterilizing the hydrated powdered soy juice;
homogenizing the hydrated powdered soy juice to form a homogenized hydrated powdered soy juice;
adding a lactic acid bacterium to the homogenized hydrated powdered soy juice, followed by fermentation to form fermented soy milk, wherein a medium for lactic acid bacterium starter comprises the homogenized hydrated powdered soy juice, the fermented soy milk having a lactic degree of 0.5% to 1.0%; and
producing cheese, the cheese comprising said fermented soy milk.

19. A method according to claim 18, further comprising:
removing whey from the fermented soy milk, the lactic degree corresponding to an amount of lactic acid by titration with 0.1 N sodium hydroxide, wherein the lactic acid bacterium and the homogenized hydrated powdered soy juice are fermented at 36° C. for twelve to twenty hours.

* * * * *